(12) United States Patent
Watanabe

(10) Patent No.: US 8,699,151 B2
(45) Date of Patent: Apr. 15, 2014

(54) IMAGING LENS

(75) Inventor: Kazuya Watanabe, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 50 days.

(21) Appl. No.: 13/412,269

(22) Filed: Mar. 5, 2012

(65) Prior Publication Data

US 2012/0293877 A1 Nov. 22, 2012

(30) Foreign Application Priority Data

May 17, 2011 (JP) .................................. 2011-110768
May 17, 2011 (JP) .................................. 2011-110769

(51) Int. Cl.
*G02B 13/02* (2006.01)
*G02B 27/64* (2006.01)
*G02B 13/18* (2006.01)

(52) U.S. Cl.
USPC ............ 359/745; 359/715; 359/747; 359/557

(58) Field of Classification Search
USPC .......... 359/683, 686, 554, 557, 715, 745–748
See application file for complete search history.

(56) References Cited

U.S. PATENT DOCUMENTS

| 5,745,306 | A | 4/1998 | Sato |
| 6,342,972 | B1 * | 1/2002 | Yamanashi ................... 359/686 |
| 7,411,745 | B2 | 8/2008 | Wada |
| 2011/0279898 | A1 * | 11/2011 | Takemoto et al. ............ 359/557 |

FOREIGN PATENT DOCUMENTS

| JP | 3486541 B2 | 1/2004 |
| JP | 3541283 B2 | 7/2004 |
| JP | 2005-321574 A | 11/2005 |
| JP | 3745104 B2 | 2/2006 |
| JP | 2008-145584 A | 6/2008 |

* cited by examiner

*Primary Examiner* — Scott J Sugarman
(74) *Attorney, Agent, or Firm* — Foley & Lardner LLP

(57) ABSTRACT

An imaging lens includes, sequentially from an object side, a first lens group having a positive refractive power; a second lens group having a negative refractive power; a third lens group having a positive refractive power; and a fourth lens group having a negative refractive power. The third lens group is configured by a single lens element, and is moved along an optical axis, whereby focusing is performed.

19 Claims, 8 Drawing Sheets

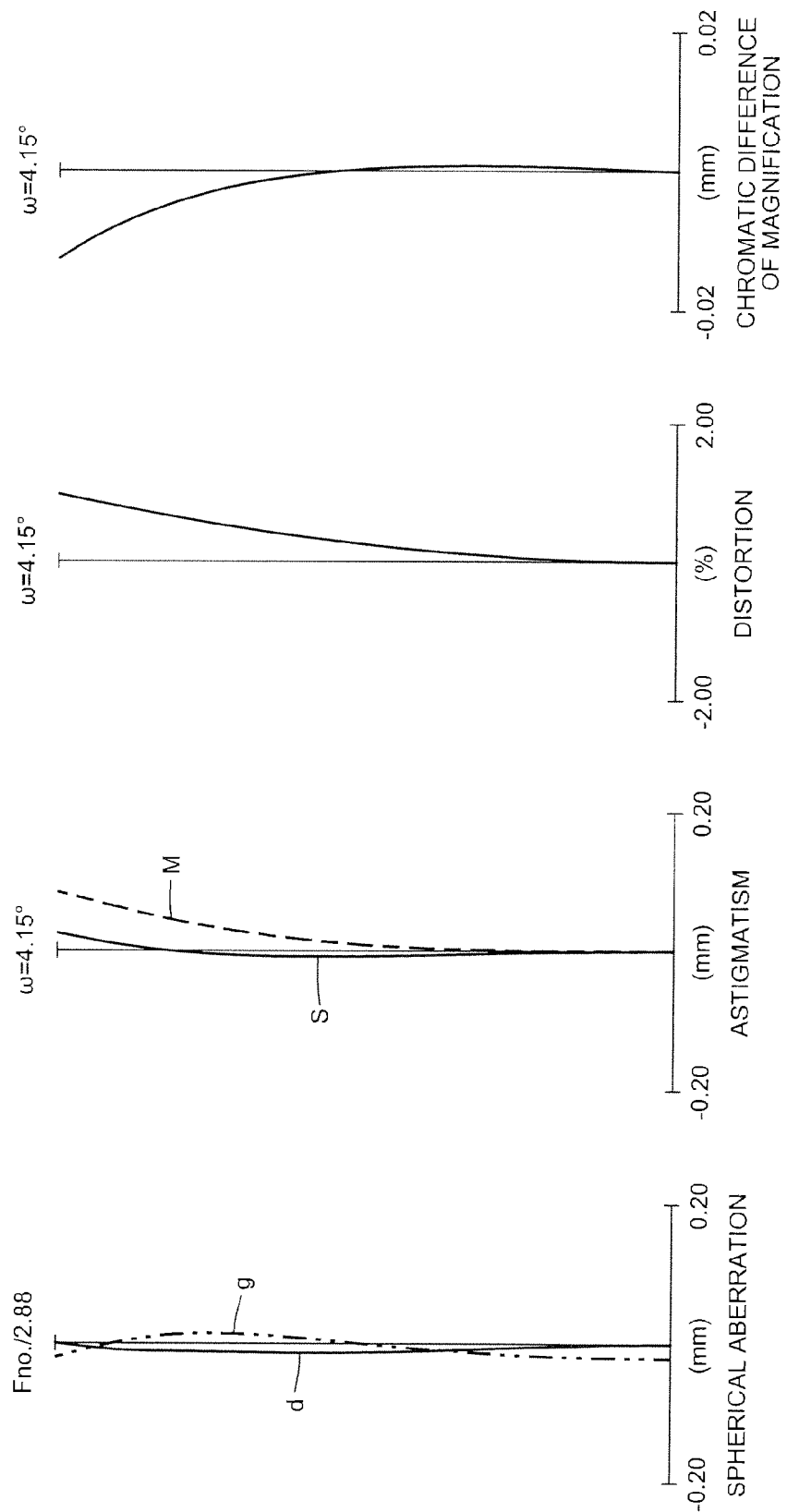

IMAGING LENS

BACKGROUND OF THE INVENTION

1. Field of the Invention

The present invention relates to an internal focus imaging lens having an anti-vibration function and suitable for digital cameras, video cameras, etc.

2. Description of the Related Art

Conventionally, numerous internal focus imaging lenses have been proposed that have an anti-vibration function of preventing image blur that occurs consequent to vibration. These imaging lenses further move a relatively light midsection lens group to perform focusing (see, for example, Japanese Patent Nos. 3745104, 3541283, and 3486541; Japanese Patent Application Laid-Open Publication Nos. 2008-145584 and 2005-321574).

Single lens reflex cameras are equipped with a mechanism that uses a mirror disposed just in front of the film, to reflect light that has passed through the imaging lens and thereby guide the light to the optical viewfinder to make the captured image and viewfinder image coincide. However, recently mirror-less single lens cameras that are significantly smaller in size and omit the reflective mirror that guides the image to the optical viewfinder have appeared. Originally, sub-reflective mirrors that guide the images to a distance measuring apparatus during auto-focusing were also disposed with these reflective mirrors. However, since mirror-less single lens cameras omit both the reflective mirror and the sub-reflective mirror, mainstream auto-focusing by phase difference detection cannot be performed in conventional single lens reflex cameras. Thus, in mirror-less single lens cameras, auto-focusing by contrast detection, which is mainstream among compact digital cameras and video cameras, is employed. However, in this case, with mainstream drive apparatuses such as DC motors and ultrasonic motors in conventional interchangeable lenses for single lens reflex cameras, necessary operations against wobble occurring with contrast detection auto-focusing are difficult. Consequently, drive apparatuses such as step motors used in compact digital cameras and video cameras are necessary.

Nonetheless, step motors have a low drive torque and with respect to a focusing lens group that is in a conventional optical system and that can be driven by a conventional DC motor or ultrasonic motor, numerous disadvantages arise related to the focusing lens group being too heavy to drive. With telephoto lenses, this tendency is strong. The same problems occur concerning the anti-vibration lens group. In particular, with a large diameter telephoto lens, since the lenses forming the anti-vibration lens group have a large diameter, anti-vibration lens group tends to be heavy. If the anti-vibration lens group becomes heavy, driving control at the time of vibration correction becomes difficult. In addition, if the lens diameter becomes large, the aberration that occurs also increases and consequently, to control the aberration, the number of lenses configuring the anti-vibration lens group has to be increased, making the anti-vibration lens group even heavier and creating a vicious circle.

The optical systems disclosed in the patent documents above are no exception and the driven focusing lens group and anti-vibration lens group are configured by multiple lenses and are thus, heavy, making driving control by a step motor, which has a low drive torque, difficult.

SUMMARY OF THE INVENTION

It is an object of the present invention to at least solve the above problems in the conventional technologies.

An imaging lens according to one aspect of the present invention includes, sequentially from an object side, a first lens group having a positive refractive power; a second lens group having a negative refractive power; a third lens group having a positive refractive power; and a fourth lens group having a negative refractive power. The third lens group is configured by a single lens element, and is moved along an optical axis, whereby focusing is performed.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 8 is a diagram of various types of aberration (at infinity focus) in the imaging lens according to the fourth embodiment.

DETAILED DESCRIPTION OF THE PREFERRED EMBODIMENTS

Figure 1:
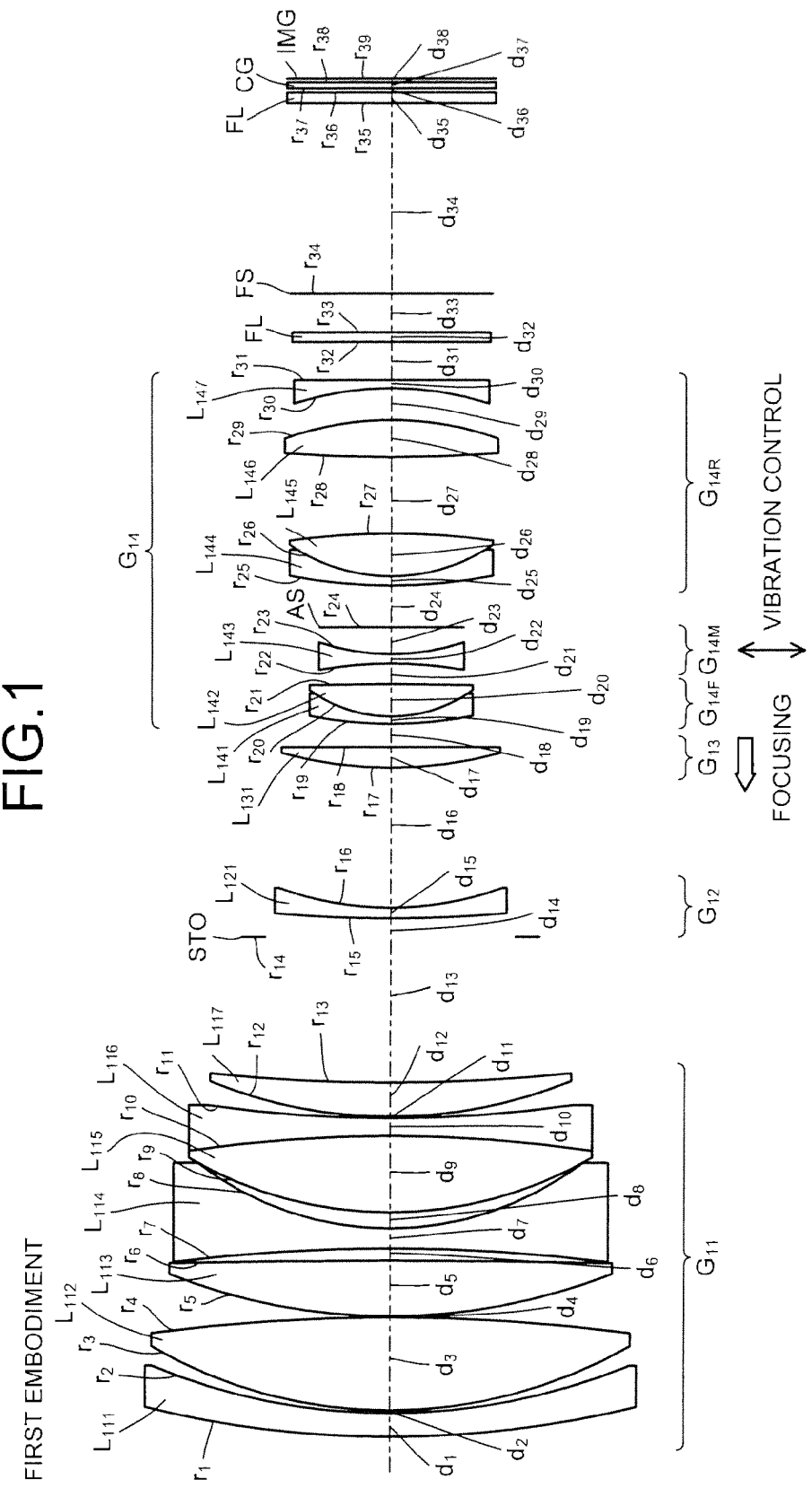
FIG. 1 is a cross sectional view (along an optical axis) of an imaging lens according to a first embodiment.

Referring to the accompanying drawings, exemplary embodiments of an imaging lens according to the present invention are explained in detail below.

The imaging lens according to the present invention includes sequentially from a side nearest an object (object side), a first lens group having a positive refractive power, a second lens group having a negative refractive power, a third lens group having a positive refractive power, and a fourth lens group having a positive refractive power.

An object of the present invention is to provide a compact imaging lens having favorable imaging performance as well as a compact and light-weight focusing lens group and anti-vibration lens group. Thus, to achieve this object, the following conditions are set.

The imaging lens according to the present invention performs focusing by moving the third lens group along the optical axis. The third lens group is preferably configured by a single lens element to facilitate reductions in size and weight. In particular, configuration by a single lens is more preferable. A single lens element configuration of the third lens group, which is the focusing lens group, and reductions in size and weight enable the load on driving mechanism of the focusing lens group, power consumption and the outer diameter of the barrel to be reduced, and further enable a lens driving mechanism having a low drive torque (e.g., a step motor) to be employed. A single lens element may be a single ground lens, an aspheric lens, and a cemented aspheric lens;

and does not include lenses that are not cemented to one another and have a gap therebetween such as 2 positive lenses.

Further, the imaging lens according to the present invention preferably satisfies the following conditional expressions, where f is the focal length of the entire optical system, $f_1$ is the focal length of the first lens group, $f_2$ is the focal length of the second lens group, $f_3$ is the focal length of the third lens group, and $f_4$ is the focal length of the fourth lens group.

$$0.4 < f_1/f < 0.5 \tag{1}$$

$$0.2 < |f_2|/f < 0.4 \tag{2}$$

$$0.4 < f_3/f < 0.6 \tag{3}$$

$$2.0 < |f_4|/f < 16.0 \tag{4}$$

Conditional expression (1) indicates a condition for suitably setting the positive refractive power of the first lens group. Below the lower limit of conditional expression (1), the positive refractive power of the first lens group becomes too strong and higher order spherical aberration easily occurs. When higher order spherical aberration occurs at the first lens group, correction of this aberration is difficult at another lens group. On the other hand, above the upper limit of conditional expression (1), the refractive power of the first lens group becomes too weak whereby the back focus increases, increasing the overall length of the optical system.

Conditional expression (2) indicates a condition for suitably setting the negative refractive power of second lens group. Below the lower limit of conditional expression (2), spherical aberration is overcorrected at the second lens group and as a result, favorable imaging performance for the optical system overall becomes difficult to maintain. On the other hand, above the upper limit of conditional expression (2), various types of aberration (particularly, spherical aberration) occurring at the first lens group, which has a positive refractive power, cannot be completely corrected at the second lens group, which has a negative refractive power, and thus, is undesirable.

Conditional expression (3) indicates a condition for suitably setting the positive refractive power of the third lens group, which is the focusing lens group. Below the lower limit of conditional expression (3), the number of lenses configuring the third lens group has to be increased in order to correct spherical aberration and coma flare. As a result, reductions in the size and weight of the focusing lens group become impossible. On the other hand, above the upper limit of conditional expression (3), the refractive power of the third lens group becomes too weak, the distance that the third lens group is moved to perform focusing increases, and imaging performance for close range imaging significantly deteriorates.

Conditional expression (4) indicates a condition for suitably setting the negative refractive power of the fourth lens group. Below the lower limit of conditional expression (4), the number of lenses configuring the fourth lens group has to be increased in order to correct spherical aberration and coma flare. As a result, reductions in the size of the optical system become difficult, thereby inviting decreases in optical transmission in the overall optical system, which is undesirable. On the other hand, above the upper limit of conditional expression (4), the back focus of the optical system becomes too long and the overall length of the optical system increases.

The imaging lens according to the present invention preferably satisfies the following conditional expression, where $\beta_3$ is the lateral magnification of the third lens group and $\beta_4$ is the lateral magnification of the fourth lens group.

$$1.5 < \beta_4^2 - (\beta_3 \times \beta_4)^2 < 2.5 \tag{5}$$

Conditional expression (5) indicates a condition for suitably setting a combination of the lateral magnification of the third lens group, which is the focusing lens group, and the lateral magnification of the fourth lens group, which is disposed closer to the image than the third lens group. Satisfaction of conditional expression (5) enables the overall length of the optical system to be shortened and imaging performance to be improved. Below the lower limit of conditional expression (5), the distance that the third lens group is moved during focusing increases, thereby increasing the overall length of the optical system and inhibiting reductions in the size of the optical system. On the other hand, above the upper limit of conditional expression (5), aberration variation during focusing becomes prominent, and thus, is undesirable.

The imaging lens according to the present invention preferably satisfies the following conditional expression, where $f_{1-2}$ is combined focal length of the first lens group and the second lens group and f is the focal length of the entire optical system.

$$1.0 < f_{1-2}/f < 2.0 \tag{6}$$

Conditional expression (6) indicates a condition for suitably setting a combination of the first lens group having a positive refractive power and the second lens group having a negative refractive power, the first and the second lens groups configuring a telephoto optical system. Below the lower limit of conditional expression (6), the optical convergence by the first lens group and the second lens group becomes strong, making the correction of various types of aberration difficult. On the other hand, above the upper limit of conditional expression (6), the configuration of the optical system approaches an a focal optical system (an optical system having a focal length at infinity) and the overall length of the optical system increases.

In the imaging lens according to the present invention, the first lens group preferably includes 1 or more negative lenses that satisfy the following conditional expression, where $\upsilon_{dA}$ is the Abbe number for the d-line of the negative lens.

$$\upsilon_{dA} > 60 \tag{7}$$

The negative lens satisfying conditional expression (7) can be formed of an affordable glass material and therefore, by disposing even 1 negative lens formed of an affordable glass material in the first lens group, the manufacturing cost of the optical system can be reduced by the amount saved consequent to the use of the glass material.

In the imaging lens according to the present invention, a positive lens that satisfies the following conditional expression, where $\upsilon_{dB}$ is the Abbe number for d-line of the positive lens, is preferably disposed closest to the image, among the lenses of the first lens group (i.e., farthest on the image side of the first group).

$$\upsilon_{dB} < 35 \tag{8}$$

By disposing farthest on the image side of the first lens group, a positive lens that satisfies conditional expression (8), the second lens group, which is disposed closer to the image than the first lens group, can be configured by 1 lens, enabling reductions in the size and weight of the optical system to be facilitated.

The imaging lens according to the present invention further has an anti-vibration correction function of correcting blur that occurs when the optical system is subject to vibration. For example, when the optical system is subject to vibration consequent to handshake, the anti-vibration lens group is moved in direction substantially perpendicular to the optical axis, whereby blur is corrected. In the imaging lens according to the present invention, the fourth lens group includes sequentially from the object side, a front group having a negative refractive power, an intermediate group having a negative refractive power, and a rear group having a positive refractive power. The intermediate group having a negative refractive power has a function of an anti-vibration lens group. In other words, the intermediate group is moved in a direction substantially perpendicular to the optical axis (shifting of lens center), whereby blur that occurs when the optical system is subject to vibration is corrected. The intermediate group is preferably configured by a single lens element to facilitate reductions in size and weight, and is more preferably configured by 1 lens. A single lens element configuration of the movable intermediate group and reductions in size and weight enable the load on the driving mechanism of the intermediate group to be decreased and power consumption to be reduced. Furthermore, a lens driving mechanism having a low drive torque (e.g., a step motor) can be employed. A single lens element is defined as described above.

The imaging lens according to the present invention preferably satisfies the following conditional expression, where $f_{ASM}$ is the focal length of the intermediate group of the fourth lens group, $f_{REAR}$ is the focal length of the rear group of the fourth lens group, and f is the focal length of the entire optical system.

$$0.1 < |f_{ASM}|/f < 0.2 \quad (9)$$

$$0.2 < f_{REAR}/f < 0.3 \quad (10)$$

Conditional expression (9) indicates a condition for suitably setting the negative refractive power of the intermediate group of the fourth lens group. Below the lower limit of conditional expression (9), the refractive power of the intermediate group of the fourth lens group becomes too strong, whereby the occurrence of spherical aberration and chromatic difference of magnification becomes prominent. Here, aberration that has become prominent is difficult to correct at another lens group. On the other hand, above the upper limit of conditional expression (9), the refractive power of the front group becomes too weak and the distance that the intermediate group, which is the anti-vibration lens group, is moved (shifting of lens center) increases, and consequently, the correction angle necessary for the anti-vibration function cannot be established.

Conditional expression (10) indicates a condition for suitably setting the positive refractive power of the rear group of the fourth lens group. Below the lower limit of conditional expression (10), overcorrected aberration occurs at the rear group of the fourth lens group and as a result, favorable imaging performance in the optical system overall becomes difficult to maintain. On the other hand, above the upper limit of conditional expression (10), various types of aberration occurring at the intermediate group in the fourth lens group and having a negative refractive power cannot be completely corrected.

The imaging lens according to the present invention preferably satisfies the following conditional expression, where $\beta_{REAR}$ is the lateral magnification of the rear group of the fourth lens group and $\beta_{ASM}$ is the lateral magnification of the intermediate group of the fourth lens group.

$$-2.0 < \beta_{REAR} - (\beta_{ASM} \times \beta_{REAR}) < -1.6 \quad (11)$$

Conditional expression (11) indicates a condition for suitably setting a combination of the lateral magnification of the intermediate group, which is the anti-vibration lens group and in the fourth lens group, and the lateral magnification of the rear group disposed on the image side of the intermediate group. Below the lower limit of conditional expression (11), aberration variation increases at the time of anti-vibration correction and thus, is undesirable. On the other hand, above the upper limit of conditional expression (11), the intermediate group of the fourth lens group is moved (shifting of lens center) over a greater distance at the time of anti-vibration correction, which increases the diameter of the optical system, and thus, is undesirable.

In the imaging lens according to the present invention, the fourth lens group may be configured as follows. In other words, the fourth lens group includes sequentially from the object side, the front group having a negative refractive power and a rear group having a positive refractive power. The front group having a negative refractive power has a function as an anti-vibration lens group and is moved substantially perpendicular to the optical axis (shifting of lens center), whereby blur occurring when the optical system is subject to vibration, is corrected. The front group is preferably configured by a single lens element to facilitate reductions in size and weight, and is more preferably configured by 1 lens. A single lens element configuration of the movable front group and reductions in size and weight enable the load on the driving mechanism of the front group to be decreased and power consumption to be reduced. Furthermore, a lens driving mechanism having a low drive torque (e.g., a step motor) can be employed. A single lens element is defined as described above.

When the fourth lens group is configured by 2 lens groups, the imaging lens according to the present invention preferably satisfies the following conditional expression, where $f_{ASF}$ is the focal length of the front group, $f_{REAR}$ is the focal length of the rear group, and f is the focal length of the entire optical system.

$$0.1 < |f_{ASF}|/f < 0.2 \quad (12)$$

$$0.2 < f_{REAR}/f < 0.3 \quad (10)$$

Conditional expression (12) corresponds to conditional expression (9) described above and when values deviate from the prescribed upper and lower limits, the disadvantages that arise are identical to those in the case of conditional expression (9).

When the fourth lens group is configured by 2 lens groups, the imaging lens according to the present invention preferably satisfies the following conditional expression, where $\beta_{REAR}$ is the lateral magnification of the rear group and $\beta_{ASF}$ is the lateral magnification of the front group.

$$-2.0 < \{\beta_{REAR} - (\beta_{ASF} \times \beta_{REAR})\} < -1.6 \quad (13)$$

Conditional expression (13) corresponds to conditional expression (11) described above and when values deviate from the prescribed upper and lower limits, the disadvantages that arise are identical to those in the case of conditional expression (11).

As described, according to the present invention, a compact imaging lens having a compact, light-weight focusing lens group and anti-vibration as well as favorable imaging performance can be realized. In particular, configuration of the focusing lens group and the anti-vibration lens group by a single lens element, respectively, enables further reductions in the size and weight of these movable lens groups. Consequently, the imaging lens is suitable for an imaging apparatus equipped with a lens drive apparatus such as a step motor having a low drive torque and can be used in an imaging apparatus equipped with a contrast detection autofocus mechanism. Further, satisfaction of the conditional expressions above suppresses the distance that the focusing lens group and anti-vibration, which are movable lens groups, are moved, thereby facilitating further reductions in the size of the optical system and enabling further improvement of the imaging performance of the optical system.

Hereinafter, with reference to the accompanying drawings, embodiments of the imaging lens according to the present invention will be described in detail. However, the present invention is not limited to the embodiments below.

FIG. 1 is a cross sectional view (along the optical axis) of the imaging lens according to a first embodiment. The imaging lens includes sequentially from a side (object side) nearest a non-depicted object, a first lens group $G_{11}$ having a positive refractive power, a second lens group $G_{12}$ having a negative refractive power, a third lens group $G_{13}$ having a positive refractive power, and a fourth lens group $G_{14}$ having a negative refractive power. An iris diaphragm STO is disposed between the first lens group $G_{11}$ and the second lens group $G_{12}$. The iris diaphragm STO has multiple diaphragm blades and by arbitrarily changing the aperture, controls the incident optical ray bundle and adjusts the F number. Between the fourth lens group $G_{14}$ and an image plane IMG, a filter FL, a field stop FS, a filter FL, and a cover glass CG are disposed sequentially from the object side. The filters FL are disposed to block infrared light. The field stop FS is disposed to suppress optical ray bundles that are not related to the image and cause unnecessary internal reflection. The cover glass CG is disposed to protect the image plane IMG. The filters FL and the cover glass CG are disposed as needed and when not necessary, can be omitted. The optical receiving surface of an image sensor, such as a CCD, CMOS, etc. is disposed at the image plane IMG.

The first lens group $G_{11}$ includes, sequentially from the object side, a negative lens $L_{111}$, a positive lens $L_{112}$, a positive lens $L_{113}$, a negative lens $L_{114}$, a positive lens $L_{115}$, a negative lens $L_{116}$, and a positive lens $L_{117}$. The positive lens $L_{115}$ and the negative lens $L_{116}$ are cemented.

The second lens group $G_{12}$ is configured by a negative lens $L_{121}$.

The third lens group $G_{13}$ is configured by a positive lens $L_{131}$. The surface of the object side of the positive lens $L_{131}$ is aspheric. The third lens group $G_{13}$ is moved along the optical axis, from the image plane IMG side toward the object side, whereby focusing from a state of infinity focus to a focus state for the minimum object distance is performed.

The fourth lens group $G_{14}$ includes, sequentially from the object side, a front group $G_{14F}$ having a negative refractive power, an intermediate group $G_{14M}$ having a negative refractive power, an aperture stop AS, and a rear group $G_{14R}$ having a positive refractive power. The aperture stop AS suppresses the occurrence of aberration, which causes deterioration of the imaging performance of the optical system. The front group $G_{14F}$ includes, sequentially from the object side, a negative lens $L_{141}$ and a positive lens $L_{142}$. The negative lens $L_{141}$ and the positive lens $L_{142}$ are cemented. The intermediate group $G_{14M}$ is configured by a negative lens $L_{143}$. Both surfaces of the negative lens $L_{143}$ are aspheric. The intermediate group $G_{14M}$ has a function as the anti-vibration lens group. In other words, the intermediate group $G_{14M}$ is moved in a direction that is substantially perpendicular to the optical axis (shifting of lens center), whereby blur that occurs when the optical system is subject to vibration consequent to handshake, is corrected. The rear group $G_{14R}$ includes, sequentially from the object side, a negative lens $L_{144}$, a positive lens $L_{145}$, a positive lens $L_{146}$, and a negative lens $L_{147}$. The negative lens $L_{144}$ and the positive lens $L_{145}$ are cemented.

Various values related to the imaging lens according to the first embodiment are indicated below.

| (Lens data) | | |
|---|---|---|
| $r_1 = 209.873$ | | |
| $d_1 = 5.000$ | $nd_1 = 1.51680$ | $vd_1 = 64.2$ |
| $r_2 = 130.945$ | | |
| $d_2 = 0.500$ | | |
| $r_3 = 100.587$ | | |
| $d_3 = 19.707$ | $nd_2 = 1.49700$ | $vd_2 = 81.6$ |
| $r_4 = -407.748$ | | |
| $d_4 = 0.300$ | | |
| $r_5 = 127.811$ | | |
| $d_5 = 11.535$ | $nd_3 = 1.49700$ | $vd_3 = 81.6$ |
| $r_6 = -3470.036$ | | |
| $d_6 = 2.700$ | | |
| $r_7 = -372.417$ | | |
| $d_7 = 4.000$ | $nd_4 = 1.51680$ | $vd_4 = 64.2$ |
| $r_8 = 67.774$ | | |
| $d_8 = 3.449$ | | |
| $r_9 = 85.849$ | | |
| $d_9 = 15.763$ | $nd_5 = 1.49700$ | $vd_5 = 81.6$ |
| $r_{10} = -303.004$ | | |
| $d_{10} = 4.000$ | $nd_6 = 1.80610$ | $vd_6 = 33.3$ |
| $r_{11} = 303.004$ | | |
| $d_{11} = 0.200$ | | |
| $r_{12} = 102.623$ | | |
| $d_{12} = 7.114$ | $nd_7 = 1.84666$ | $vd_7 = 23.8$ |
| $r_{13} = 406.606$ | | |
| $d_{13} = 21.677$ | | |
| $r_{14} = \infty$ (iris diaphragm) | | |
| $d_{14} = 12.652$ | | |
| $r_{15} = 345.746$ | | |
| $d_{15} = 2.000$ | $nd_8 = 1.84666$ | $vd_8 = 23.8$ |
| $r_{16} = 66.823$ | | |
| $d_{16} = 29.779$ | | |
| $r_{17} = 92.929$ (aspheric surface) | | |
| $d_{17} = 4.000$ | $nd_9 = 1.58313$ | $vd_9 = 59.5$ |
| $r_{18} = 1608.056$ | | |
| $d_{18} = 5.000$ | | |
| $r_{19} = 84.455$ | | |
| $d_{19} = 1.700$ | $nd_{10} = 1.90366$ | $vd_{10} = 31.3$ |
| $r_{20} = 29.625$ | | |
| $d_{20} = 6.684$ | $nd_{11} = 1.48749$ | $vd_{11} = 70.4$ |
| $r_{21} = -416.181$ | | |
| $d_{21} = 4.395$ | | |
| $r_{22} = -81.133$ (aspheric surface) | | |
| $d_{22} = 2.000$ | $nd_{12} = 1.58313$ | $vd_{12} = 59.5$ |
| $r_{23} = 45.256$ (aspheric surface) | | |
| $d_{23} = 5.783$ | | |
| $r_{24} = \infty$ (aperture stop) | | |
| $d_{24} = 8.748$ | | |
| $r_{25} = 120.487$ | | |
| $d_{25} = 1.900$ | $nd_{13} = 1.84666$ | $vd_{13} = 23.8$ |
| $r_{26} = 36.921$ | | |
| $d_{26} = 8.887$ | $nd_{14} = 1.80610$ | $vd_{14} = 33.3$ |
| $r_{27} = -161.596$ | | |
| $d_{27} = 16.221$ | | |
| $r_{28} = 258.217$ | | |
| $d_{28} = 7.846$ | $nd_{15} = 1.80518$ | $vd_{15} = 25.5$ |
| $r_{29} = -66.637$ | | |
| $d_{29} = 6.629$ | | |
| $r_{30} = -72.972$ | | |
| $d_{30} = 1.600$ | $nd_{16} = 1.80420$ | $vd_{16} = 46.5$ |
| $r_{31} = 916.012$ | | |
| $d_{31} = 8.232$ | | |
| $r_{32} = \infty$ | | |
| $d_{32} = 2.000$ | $nd_{17} = 1.51680$ | $vd_{17} = 64.2$ |
| $r_{33} = \infty$ | | |
| $d_{33} = 8.000$ | | |
| $r_{34} = \infty$ (field stop) | | |
| $d_{34} = 39.800$ | | |
| $r_{35} = \infty$ | | |
| $d_{35} = 2.200$ | $nd_{18} = 1.51680$ | $vd_{18} = 64.2$ |
| $r_{36} = \infty$ | | |
| $d_{36} = 1.000$ | | |
| $r_{37} = \infty$ | | |
| $d_{37} = 1.000$ | $nd_{19} = 1.51680$ | $vd_{19} = 64.2$ |

-continued $r_{38} = \infty$
$d_{38} = 1.000$
$r_{39} = \infty$ (image plane)

(Constants of the cone (k) and aspheric coefficients ($A_4$, $A_6$))

(Seventeenth plane)

$k = -3.34693$,
$A_4 = 5.79748 \times 10^{-7}$, $A_6 = 2.89688 \times 10^{-11}$
(Twenty-second plane)

$k = -1.89878$,
$A_4 = 0$, $A_6 = 0$
(Twenty-third plane)

$k = -1.77787$,
$A_4 = 0$, $A_6 = 0$ f (focal length of entire optical system) = 294.00
F no. = 2.88
2ω (angle of view) = 8.3
(Values related to conditional expression (1))
$f_1/f = 0.444$
(Values related to conditional expression (2))
$|f_2|/f = 0.331$
(Values related to conditional expression (3))
$f_3/f = 0.572$
(Values related to conditional expression (4))
$|f_4|/f = 4.033$
(Values related to conditional expression (5))
$\beta_4^2 - (\beta_3 \times \beta_4)^2 = 1.545$
(Values related to conditional expression (6))
$f_{1-2}/f = 1.154$
(Values related to conditional expression (7))
$\nu_{dA}$ (Abbe number for d-line of negative lens $L_{111}$, negative lens $L_{114}$) = 64.2
(Values related to conditional expression (8))
$\nu_{dB}$ (Abbe number for d-line of positive lens $L_{117}$) = 23.8
(Values related to conditional expression (9))
$|f_{ASM}|/f = 0.168$
(Values related to conditional expression (10))
$f_{REAR}/f = 0.244$
(Values related to conditional expression (11))
$\beta_{REAR} - (\beta_{ASM} \times \beta_{REAR}) = -1.681$ Among the values for each of the embodiments, $r_1, r_2, \ldots$ indicate radii of curvature for each lens, diaphragm surface, etc.; $d_1, d_2, \ldots$ indicate the thickness of the lenses, diaphragm, etc. or the distance between surfaces thereof; $nd_1, nd_2, \ldots$ indicate the refraction index of each lens with respect to the d-line (λ=587.56 nm); and $\upsilon d_1, \upsilon d_2, \ldots$ indicate the Abbe number with respect to the d-line (λ=587.56 nm) of each lens. Lengths are indicated in units of [mm] and angles are indicated in [degrees].

Each aspheric surface shape above is expressed by equation [1], where Z is the distance from the vertex of the lens surface to the optical axis; c(=1/r, where, r=radius of curvature) is paraxial radius of curvature at the vertex of the lens surface; h is the height from the optical axis; K is the constant of the cone; $A_4$ and $A_6$ are the fourth and sixth aspheric coefficients, respectively; and the travel direction of light is positive.

$$Z = \frac{ch^2}{1 + \sqrt{1 - (1+k)c^2 h^2}} + A_4 h^4 + A_6 h^6 \qquad [1]$$

Figure 2:
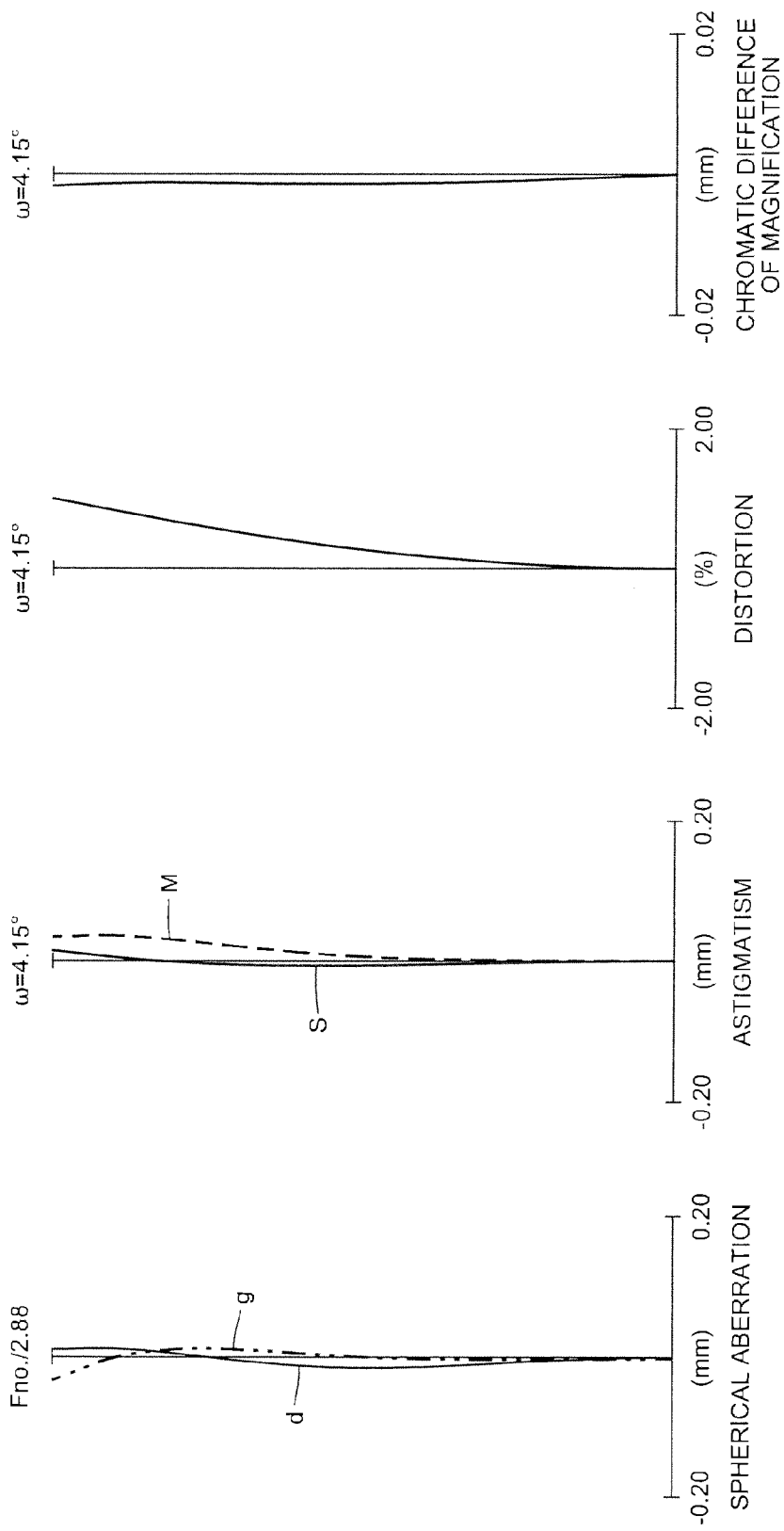
FIG. 2 is a diagram of various types of aberration (at infinity focus) in the imaging lens according to the first embodiment.

FIG. 2 is a diagram of various types of aberration (at infinity focus) in the imaging lens according to the first embodiment. In the diagram, g indicates the wavelength aberration corresponding to g-line (λ=435.83 nm), d indicates the wavelength aberration corresponding to d-line (λ=587.56 nm). Furthermore, in the diagram, S and M shown with respect to astigmatism, respectively indicate aberration at the sagittal image plane and at the meridonal image plane.

As described, in the imaging lens of the first embodiment, the focusing lens group and the anti-vibration lens group are respectively configured by 1 lens, facilitating reductions in the size and weight of these movable lens groups and enabling further reduction of the size of the optical system overall. In particular, satisfaction of the conditional expressions above suppresses the distance that the focusing lens group and the anti-vibration lens group move, facilitating further reduction of the size of the optical system and enabling further improvement of the imaging performance of the optical system. Further, the imaging lens of the first embodiment uses, as necessary, lenses having an aspheric surface and cemented lenses, whereby favorable imaging performance can be maintained by fewer lenses.

Figure 3:
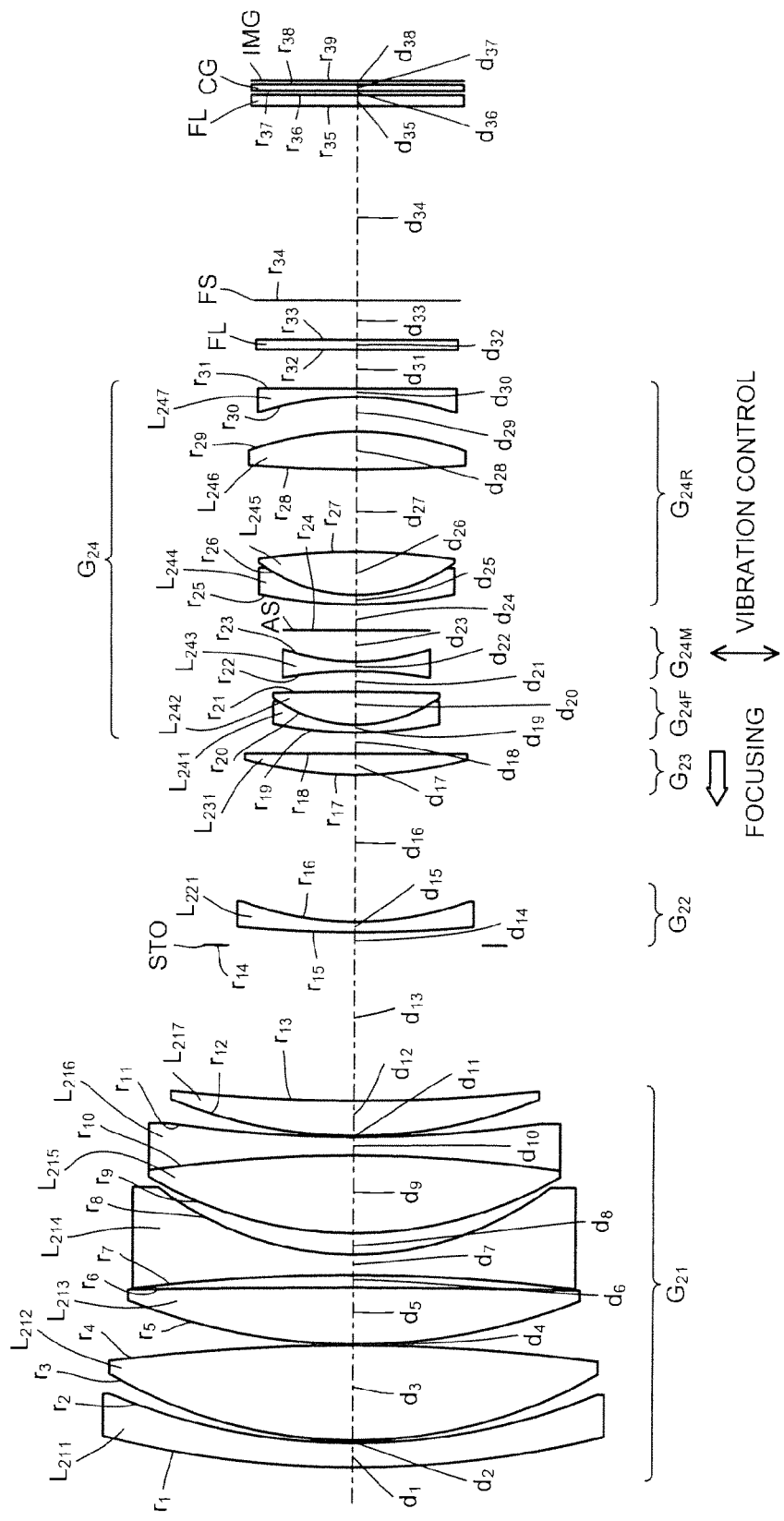
FIG. 3 is a cross sectional view (along the optical axis) of the imaging lens according to a second embodiment.

FIG. 3 is a cross sectional view (along the optical axis) of the imaging lens according to a second embodiment. The imaging lens includes sequentially from a side (object side) nearest a non-depicted object, a first lens group $G_{21}$ having a positive refractive power, a second lens group $G_{22}$ having a negative refractive power, a third lens group $G_{23}$ having a positive refractive power, and a fourth lens group $G_{24}$ having a positive refractive power. The iris diaphragm STO is disposed between the first lens group $G_{21}$ and the second lens group $G_{22}$. The iris diaphragm STO has multiple diaphragm blades and by arbitrarily changing the aperture, controls the incident optical ray bundle and adjusts the F number. Between the fourth lens group $G_{24}$ and the image plane IMG, the filter FL, the field stop FS, the filter FL, and the cover glass CG are disposed sequentially from the object side. The filters FL are disposed to block infrared light. The field stop FS is disposed to suppress optical ray bundles that are not related to the image and cause unnecessary internal reflection. The cover glass CG is disposed to protect the image plane IMG. The filters FL and the cover glass CG are disposed as needed and when not necessary, can be omitted. The optical receiving surface of the image sensor, such as a CCD, CMOS, etc. is disposed at the image plane IMG.

The first lens group $G_{21}$ includes, sequentially from the object side, a negative lens $L_{211}$, a positive lens $L_{212}$, a positive lens $L_{213}$, a negative lens $L_{214}$, a positive lens $L_{215}$, a negative lens $L_{216}$, and a positive lens $L_{217}$. The positive lens $L_{215}$ and the negative lens $L_{216}$ are cemented.

The second lens group $G_{22}$ is configured by a negative lens $L_{221}$.

The third lens group $G_{23}$ is configured by a positive lens $L_{231}$. The surface of the object side of the positive lens $L_{231}$ is aspheric. The third lens group $G_{23}$ is moved along the optical axis, from the image plane IMG side toward the object side, whereby focusing from the state of infinity focus to the focus state for the minimum object distance is performed.

The fourth lens group $G_{24}$ includes, sequentially from the object side, a front group $G_{24F}$ having a negative refractive power, an intermediate group $G_{24M}$ having a negative refractive power, the aperture stop AS, and a rear group $G_{24R}$ having a positive refractive power. The aperture stop AS suppresses the occurrence of aberration, which causes deterioration of the imaging performance of the optical system. The front group $G_{24F}$ includes, sequentially from the object side, a negative lens $L_{241}$ and a positive lens $L_{242}$. The negative lens $L_{241}$ and the positive lens $L_{242}$ are cemented. The intermediate group $G_{24M}$ is configured by a negative lens $L_{243}$. Both surfaces of the negative lens $L_{243}$ are aspheric. The intermediate group $G_{24M}$ has a function as the anti-vibration lens group. In other words, the intermediate group $G_{24M}$ is moved in a direction that is substantially perpendicular to the optical axis (shifting of lens center), whereby blur that occurs when the optical system is subject to vibration consequent to handshake, is corrected. The rear group $G_{24R}$ includes, sequentially from the object side, a negative lens $L_{244}$, a positive lens $L_{245}$, a positive lens $L_{246}$, and a negative lens $L_{247}$. The negative lens $L_{244}$ and the positive lens $L_{245}$ are cemented.

Various values related to the imaging lens according to the second embodiment are indicated below.

| (Lens data) | | | |
|---|---|---|---|
| $r_1 = 219.426$ | | | |
| $d_1 = 5.000$ | | $nd_1 = 1.51680$ | $vd_1 = 64.2$ |
| $r_2 = 134.759$ | | | |
| $d_2 = 0.500$ | | | |
| $r_3 = 101.237$ | | | |
| $d_3 = 19.623$ | | $nd_2 = 1.49700$ | $vd_2 = 81.6$ |
| $r_4 = -405.162$ | | | |
| $d_4 = 0.300$ | | | |
| $r_5 = 127.435$ | | | |
| $d_5 = 11.549$ | | $nd_3 = 1.49700$ | $vd_3 = 81.6$ |
| $r_6 = -3866.078$ | | | |
| $d_6 = 2.713$ | | | |
| $r_7 = -375.484$ | | | |
| $d_7 = 4.000$ | | $nd_4 = 1.51680$ | $vd_4 = 64.2$ |
| $r_8 = 67.794$ | | | |
| $d_8 = 4.283$ | | | |
| $r_9 = 85.387$ | | | |
| $d_9 = 16.051$ | | $nd_5 = 1.49700$ | $vd_5 = 81.6$ |
| $r_{10} = -283.495$ | | | |
| $d_{10} = 4.000$ | | $nd_6 = 1.80610$ | $vd_6 = 33.3$ |
| $r_{11} = 311.150$ | | | |
| $d_{11} = 0.200$ | | | |
| $r_{12} = 102.482$ | | | |
| $d_{12} = 7.098$ | | $nd_7 = 1.84666$ | $vd_7 = 23.8$ |
| $r_{13} = 401.606$ | | | |
| $d_{13} = 22.225$ | | | |
| $r_{14} = \infty$ (iris diaphragm) | | | |
| $d_{14} = 12.242$ | | | |
| $r_{15} = 299.644$ | | | |
| $d_{15} = 2.000$ | | $nd_8 = 1.84666$ | $vd_8 = 23.8$ |
| $r_{16} = 63.960$ | | | |
| $d_{16} = 30.324$ | | | |
| $r_{17} = 89.122$ (aspheric surface) | | | |
| $d_{17} = 4.000$ | | $nd_9 = 1.62263$ | $vd_9 = 58.2$ |
| $r_{18} = 1359.164$ | | | |
| $d_{18} = 5.000$ | | | |
| $r_{19} = 119.166$ | | | |
| $d_{19} = 1.700$ | | $nd_{10} = 1.80610$ | $vd_{10} = 33.3$ |
| $r_{20} = 29.620$ | | | |
| $d_{20} = 6.687$ | | $nd_{11} = 1.48749$ | $vd_{11} = 70.4$ |
| $r_{21} = -416.013$ | | | |
| $d_{21} = 4.267$ | | | |
| $r_{22} = -90.410$ (aspheric surface) | | | |
| $d_{22} = 2.000$ | | $nd_{12} = 1.62263$ | $vd_{12} = 58.2$ |
| $r_{23} = 47.203$ (aspheric surface) | | | |
| $d_{23} = 6.291$ | | | |
| $r_{24} = \infty$ (aperture stop) | | | |
| $d_{24} = 4.933$ | | | |
| $r_{25} = 107.620$ | | | |
| $d_{25} = 1.900$ | | $nd_{13} = 1.84666$ | $vd_{13} = 23.8$ |
| $r_{26} = 36.734$ | | | |
| $d_{26} = 8.410$ | | $nd_{14} = 1.80610$ | $vd_{14} = 33.3$ |
| $r_{27} = -304.490$ | | | |
| $d_{27} = 17.803$ | | | |
| $r_{28} = 178.581$ | | | |
| $d_{28} = 7.617$ | | $nd_{15} = 1.75520$ | $vd_{15} = 27.5$ |
| $r_{29} = -65.112$ | | | |
| $d_{29} = 7.685$ | | | |
| $r_{30} = -65.282$ | | | |
| $d_{30} = 1.600$ | | $nd_{16} = 1.72916$ | $vd_{16} = 54.7$ |
| $r_{31} = -857.194$ | | | |
| $d_{31} = 8.000$ | | | |
| $r_{32} = \infty$ | | | |
| $d_{32} = 2.000$ | | $nd_{17} = 1.51680$ | $vd_{17} = 64.2$ |
| $r_{33} = \infty$ | | | |
| $d_{33} = 8.000$ | | | |
| $r_{34} = \infty$ (field stop) | | | |
| $d_{34} = 39.800$ | | | |
| $r_{35} = \infty$ | | | |
| $d_{35} = 2.200$ | | $nd_{18} = 1.51680$ | $vd_{18} = 64.2$ |
| $r_{36} = \infty$ | | | |
| $d_{36} = 1.000$ | | | |
| $r_{37} = \infty$ | | | |
| $d_{37} = 1.000$ | | $nd_{19} = 1.51680$ | $vd_{19} = 64.2$ |
| $r_{38} = \infty$ | | | |
| $d_{38} = 1.000$ | | | |
| $r_{39} = \infty$ (image plane) | | | |

(Constants of the cone (k) and aspheric coefficients ($A_4$, $A_6$))

(Seventeenth plane)

$k = -8.38717 \times 10^{-1}$,
$A_4 = 2.02307 \times 10^{-7}, A_6 = 7.21561 \times 10^{-11}$
(Twenty-second plane)

$k = -1.44884$,
$A_4 = 0, A_6 = 0$
(Twenty-third plane)

$k = -1.89336$,
$A_4 = 0, A_6 = 0$ f (focal length of entire optical system) = 294.00
F no. = 2.88
2ω (angle of view) = 8.3
(Values related to conditional expression (1))
$f_1/f = 0.444$
(Values related to conditional expression (2))
$|f_2|/f = 0.325$
(Values related to conditional expression (3))
$f_3/f = 0.518$
(Values related to conditional expression (4))
$|f_4|/f = 3.045$
(Values related to conditional expression (5))
$\beta_4^2 - (\beta_3 \times \beta_4)^2 = 1.717$
(Values related to conditional expression (6))
$f_{1-2}/f = 1.178$
(Values related to conditional expression (7))
$v_{dA}$ (Abbe number for d-line of negative lens $L_{211}$, negative lens $L_{214}$) = 64.2
(Values related to conditional expression (8))
$v_{dB}$ (Abbe number for d-line of positive lens $L_{217}$) = 23.8
(Values related to conditional expression (9))
$|f_{ASM}|/f = 0.168$
(Values related to conditional expression (10))
$f_{REAR}/f = 0.221$
(Values related to conditional expression (11))
$\beta_{REAR} - (\beta_{ASM} \times \beta_{REAR}) = -1.676$ Among the values for each of the embodiments, $r_1, r_2, \ldots$ indicate radii of curvature for each lens, diaphragm surface, etc.; $d_1, d_2, \ldots$ indicate the thickness of the lenses, diaphragm, etc. or the distance between surfaces thereof; $nd_1, nd_2, \ldots$ indicate the refraction index of each lens with respect to the d-line (λ=587.56 nm); and $vd_1, vd_2, \ldots$ indicate the Abbe number with respect to the d-line (λ=587.56 nm) of each lens. Lengths are indicated in units of [mm] and angles are indicated in [degrees].

Each aspheric surface shape above is expressed by equation [1], where Z is the distance from the vertex of the lens surface to the optical axis; c(=1/r, where, r=radius of curvature) is paraxial radius of curvature at the vertex of the lens surface; h is the height from the optical axis; K is the constant of the cone; $A_4$ and $A_6$ are the fourth and sixth aspheric coefficients, respectively; and the travel direction of light is positive.

Figure 4:
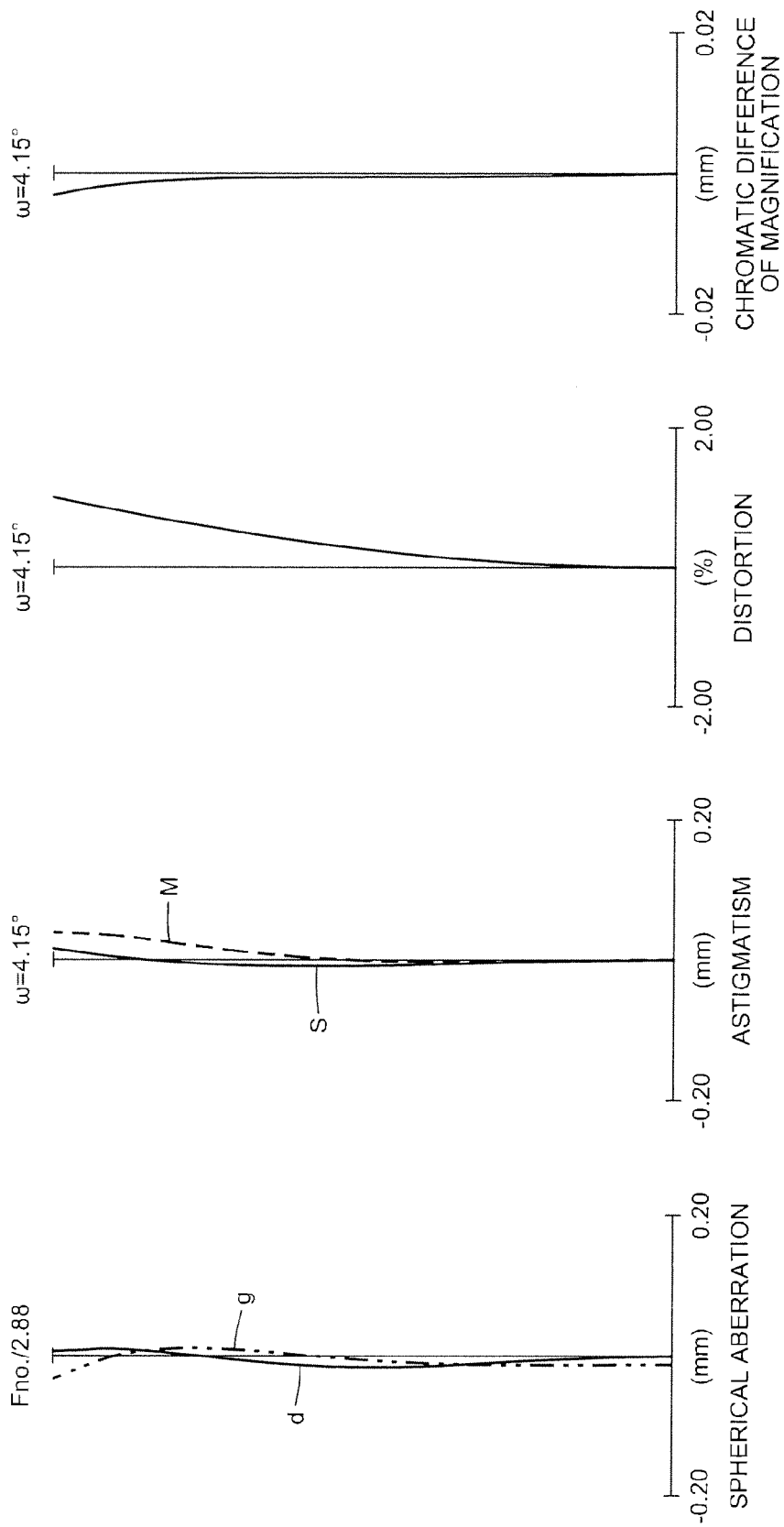
FIG. 4 is a diagram of various types of aberration (at infinity focus) in the imaging lens according to the second embodiment.

FIG. 4 is a diagram of various types of aberration (at infinity focus) in the imaging lens according to the second embodiment. In the diagram, g indicates the wavelength aberration corresponding to g-line (λ=435.83 nm), d indicates the wavelength aberration corresponding to d-line (λ=587.56 nm). Furthermore, in the diagram, S and M shown with respect to astigmatism, respectively indicate aberration at the sagittal image plane and at the meridonal image plane.

As described, in the imaging lens of the second embodiment, the focusing lens group and the anti-vibration lens group are respectively configured by 1 lens, facilitating reductions in the size and weight of these movable lens groups and enabling further reduction of the size of the optical system overall. In particular, satisfaction of the conditional expressions above suppresses the distance that the focusing lens group and the anti-vibration lens group move, facilitating further reduction of the size of the optical system and enabling further improvement of the imaging performance of the optical system. Further, the imaging lens of the second embodiment uses, as necessary, lenses having an aspheric surface and cemented lenses, whereby favorable imaging performance can be maintained by fewer lenses.

Figure 5:
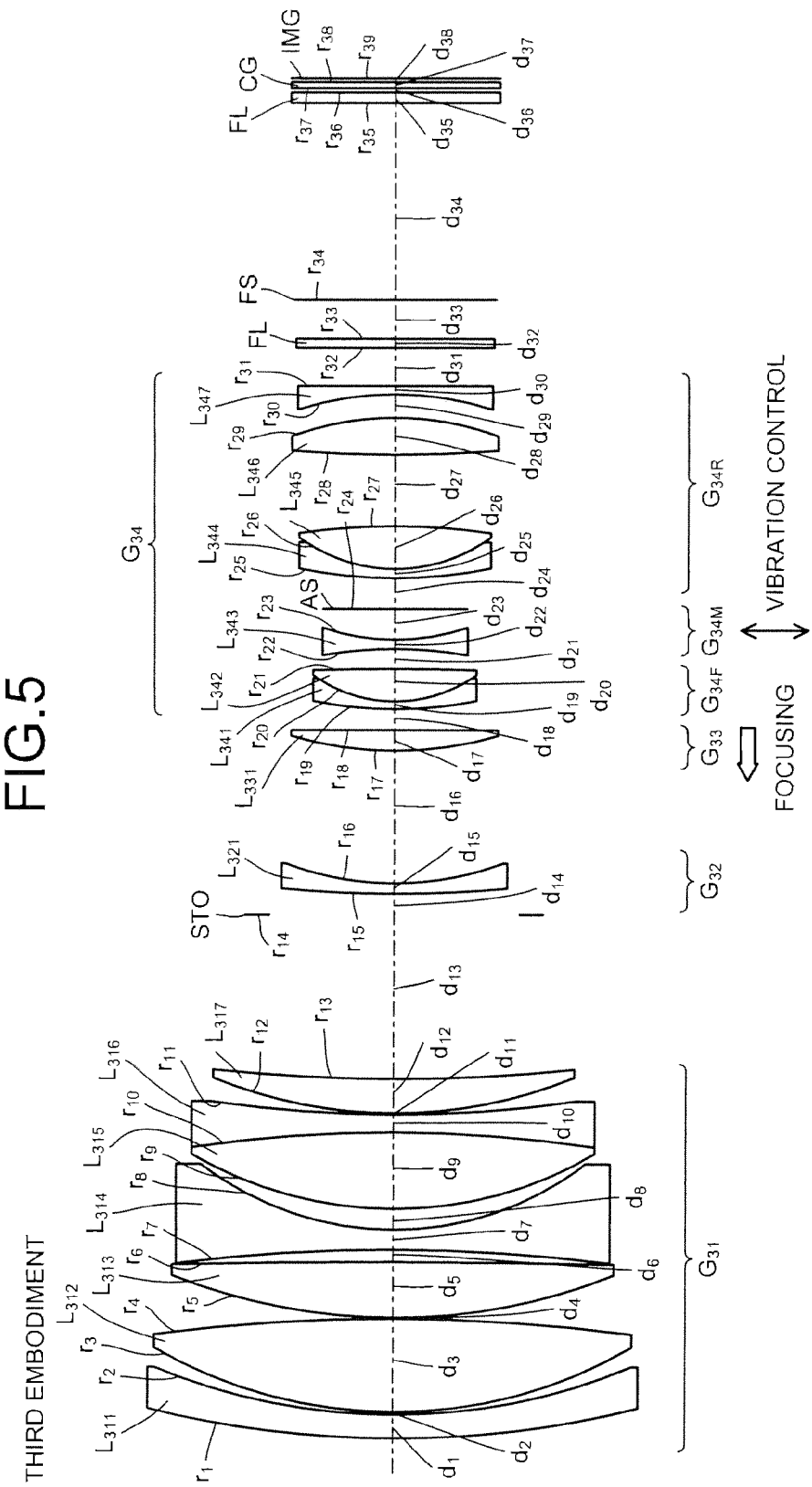
FIG. 5 is a cross sectional view (along the optical axis) of the imaging lens according to a third embodiment.

FIG. 5 is a cross sectional view (along the optical axis) of the imaging lens according to a third embodiment. The imaging lens includes sequentially from a side (object side) nearest a non-depicted object, a first lens group $G_{31}$ having a positive refractive power, a second lens group $G_{32}$ having a negative refractive power, a third lens group $G_{33}$ having a positive refractive power, and a fourth lens group $G_{34}$ having a positive refractive power. The iris diaphragm STO is disposed between the first lens group $G_{31}$ and the second lens group $G_{32}$. The iris diaphragm STO has multiple diaphragm blades and by arbitrarily changing the aperture, controls the incident optical ray bundle and adjusts the F number. Between the fourth lens group $G_{34}$ and the image plane IMG, the filter FL, the field stop FS, the filter FL, and the cover glass CG are disposed sequentially from the object side. The filters FL are disposed to block infrared light. The field stop FS is disposed to suppress optical ray bundles that are not related to the image and cause unnecessary internal reflection. The cover glass CG is disposed to protect the image plane IMG. The filters FL and the cover glass CG are disposed as needed and when not necessary, can be omitted. The optical receiving surface of the image sensor, such as a CCD, CMOS, etc. is disposed at the image plane IMG.

The first lens group $G_{31}$ includes, sequentially from the object side, a negative lens $L_{311}$, a positive lens $L_{312}$, a positive lens $L_{313}$, a negative lens $L_{314}$, a positive lens $L_{315}$, a negative lens $L_{316}$, and a positive lens $L_{317}$. The positive lens $L_{315}$ and the negative lens $L_{316}$ are cemented.

The second lens group $G_{32}$ is configured by a negative lens $L_{321}$.

The third lens group $G_{33}$ is configured by a positive lens $L_{331}$. The surface of the object side of the positive lens $L_{331}$ is aspheric. The third lens group $G_{33}$ is moved along the optical axis, from the image plane IMG side toward the object side, whereby focusing from the state of infinity focus to the focus state for the minimum object distance is performed.

The fourth lens group $G_{34}$ includes, sequentially from the object side, a front group $G_{34F}$ having a negative refractive power, an intermediate group $G_{34M}$ having a negative refractive power, the aperture stop AS, and a rear group $G_{34R}$ having a positive refractive power. The aperture stop AS suppresses the occurrence of aberration, which causes deterioration of the imaging performance of the optical system. The front group $G_{34F}$ includes, sequentially from the object side, a negative lens $L_{341}$ and a positive lens $L_{342}$. The negative lens $L_{341}$ and the positive lens $L_{342}$ are cemented. The intermediate group $G_{34M}$ is configured by a negative lens $L_{343}$. Both surfaces of the negative lens $L_{343}$ are aspheric. The intermediate group $G_{34M}$ has a function as the anti-vibration lens group. In other words, the intermediate group $G_{34M}$ is moved in a direction that is substantially perpendicular to the optical axis (shifting of lens center), whereby blur that occurs when the optical system is subject to vibration consequent to handshake, is corrected. The rear group $G_{34R}$ includes, sequentially from the object side, a negative lens $L_{344}$, a positive lens $L_{345}$, a positive lens $L_{346}$, and a negative lens $L_{347}$. The negative lens $L_{344}$ and the positive lens $L_{345}$ are cemented.

Various values related to the imaging lens according to the third embodiment are indicated below.

| (Lens data) | | |
|---|---|---|
| $r_1 = 220.178$ | | |
| $d_1 = 5.000$ | $nd_1 = 1.51680$ | $vd_1 = 64.2$ |
| $r_2 = 135.079$ | | |
| $d_2 = 0.500$ | | |
| $r_3 = 101.861$ | | |
| $d_3 = 19.514$ | $nd_2 = 1.49700$ | $vd_2 = 81.6$ |
| $r_4 = -421.241$ | | |
| $d_4 = 0.313$ | | |
| $r_5 = 135.294$ | | |
| $d_5 = 11.021$ | $nd_3 = 1.49700$ | $vd_3 = 81.6$ |
| $r_6 = -4074.120$ | | |
| $d_6 = 2.701$ | | |
| $r_7 = -382.643$ | | |
| $d_7 = 4.000$ | $nd_4 = 1.51680$ | $vd_4 = 64.2$ |
| $r_8 = 69.080$ | | |
| $d_8 = 4.054$ | | |
| $r_9 = 85.435$ | | |
| $d_9 = 16.480$ | $nd_5 = 1.49700$ | $vd_5 = 81.6$ |
| $r_{10} = -275.253$ | | |
| $d_{10} = 4.000$ | $nd_6 = 1.80610$ | $vd_6 = 33.3$ |
| $r_{11} = 325.486$ | | |
| $d_{11} = 0.200$ | | |
| $r_{12} = 106.114$ | | |
| $d_{12} = 7.163$ | $nd_7 = 1.84666$ | $vd_7 = 23.8$ |
| $r_{13} = 443.488$ | | |
| $d_{13} = 23.592$ | | |
| $r_{14} = \infty$ (iris diaphragm) | | |
| $d_{14} = 15.087$ | | |
| $r_{15} = 372.717$ | | |
| $d_{15} = 2.000$ | $nd_8 = 1.84666$ | $vd_8 = 23.8$ |
| $r_{16} = 64.213$ | | |
| $d_{16} = 28.151$ | | |
| $r_{17} = 86.524$ (aspheric surface) | | |
| $d_{17} = 4.000$ | $nd_9 = 1.67790$ | $vd_9 = 54.9$ |
| $r_{18} = 1877.282$ | | |
| $d_{18} = 5.000$ | | |
| $r_{19} = 126.348$ | | |
| $d_{19} = 1.700$ | $nd_{10} = 1.80000$ | $vd_{10} = 29.9$ |
| $r_{20} = 30.389$ | | |
| $d_{20} = 6.382$ | $nd_{11} = 1.48749$ | $vd_{11} = 70.4$ |
| $r_{21} = -381.691$ | | |
| $d_{21} = 4.077$ | | |
| $r_{22} = -104.099$ (aspheric surface) | | |
| $d_{22} = 2.000$ | $nd_{12} = 1.67790$ | $vd_{12} = 54.9$ |
| $r_{23} = 48.888$ (aspheric surface) | | |
| $d_{23} = 6.850$ | | |
| $r_{24} = \infty$ (aperture stop) | | |
| $d_{24} = 6.029$ | | |
| $r_{25} = 96.499$ | | |
| $d_{25} = 2.500$ | $nd_{13} = 1.84666$ | $vd_{13} = 23.8$ |
| $r_{26} = 38.478$ | | |
| $d_{26} = 8.537$ | $nd_{14} = 1.80610$ | $vd_{14} = 33.3$ |
| $r_{27} = -305.357$ | | |
| $d_{27} = 15.280$ | | |
| $r_{28} = 233.243$ | | |
| $d_{28} = 7.757$ | $nd_{15} = 1.80518$ | $vd_{15} = 25.5$ |
| $r_{29} = -65.129$ | | |
| $d_{29} = 4.920$ | | |
| $r_{30} = -62.149$ | | |
| $d_{30} = 1.643$ | $nd_{16} = 1.72916$ | $vd_{16} = 54.7$ |
| $r_{31} = -1262.573$ | | |
| $d_{31} = 8.000$ | | |
| $r_{32} = \infty$ | | |
| $d_{32} = 2.000$ | $nd_{17} = 1.51680$ | $vd_{17} = 64.2$ |

-continued $r_{33} = \infty$
$d_{33} = 8.000$
$r_{34} = \infty$ (field stop)
$d_{34} = 41.348$
$r_{35} = \infty$
$d_{35} = 2.200$           $nd_{18} = 1.51680$    $vd_{18} = 64.2$
$r_{36} = \infty$
$d_{36} = 1.000$
$r_{37} = \infty$
$d_{37} = 1.000$           $nd_{19} = 1.51680$    $vd_{19} = 64.2$
$r_{38} = \infty$
$d_{38} = 1.000$
$r_{39} = \infty$ (image plane)

(Constants of the cone (k) and aspheric coefficients ($A_4$, $A_6$))

(Seventeenth plane)

$k = -2.93110 \times 10^{-1}$,
$A_4 = 9.64053 \times 10^{-8}$, $A_6 = 6.73961 \times 10^{-11}$
(Twenty-second plane)

$k = -1.80583$,
$A_4 = 0, A_6 = 0$
(Twenty-third plane)

$k = -1.78076$,
$A_4 = 0, A_6 = 0$ f (focal length of entire optical system) = 294.00
F no. = 2.88
2ω (angle of view) = 8.3
(Values related to conditional expression (1))
$f_1/f = 0.453$
(Values related to conditional expression (2))
$|f_2|/f = 0.310$
(Values related to conditional expression (3))
$f_3/f = 0.453$
(Values related to conditional expression (4))
$|f_4|/f = 2.577$
(Values related to conditional expression (5))
$\beta_4^2 - (\beta_3 \times \beta_4)^2 = 1.919$
(Values related to conditional expression (6))
$f_{1-2}/f = 1.273$
(Values related to conditional expression (7))
$\nu_{dA}$ (Abbe number for d-line of negative lens $L_{311}$, negative lens $L_{314}$) = 64.2
(Values related to conditional expression (8))
$\nu_{dB}$ (Abbe number for d-line of positive lens $L_{317}$) = 23.8
(Values related to conditional expression (9))
$|f_{ASM}|/f = 0.165$
(Values related to conditional expression (10))
$f_{REAR}/f = 0.224$
(Values related to conditional expression (11))
$\beta_{REAR} - (\beta_{ASM} \times \beta_{REAR}) = -1.680$ Among the values for each of the embodiments, $r_1$, $r_2$, . . . indicate radii of curvature for each lens, diaphragm surface, etc.; $d_1$, $d_2$, . . . indicate the thickness of the lenses, diaphragm, etc. or the distance between surfaces thereof; $nd_1$, $nd_2$, . . . indicate the refraction index of each lens with respect to the d-line (λ=587.56 nm); and $\nu d_1$, $\nu d_2$, . . . indicate the Abbe number with respect to the d-line (λ=587.56 nm) of each lens. Lengths are indicated in units of [mm] and angles are indicated in [degrees].

Each aspheric surface shape above is expressed by equation [1], where Z is the distance from the vertex of the lens surface to the optical axis; c(=1/r, where, r=radius of curvature) is paraxial radius of curvature at the vertex of the lens surface; h is the height from the optical axis; K is the constant of the cone; $A_4$ and $A_6$ are the fourth and sixth aspheric coefficients, respectively; and the travel direction of light is positive.

Figure 6:
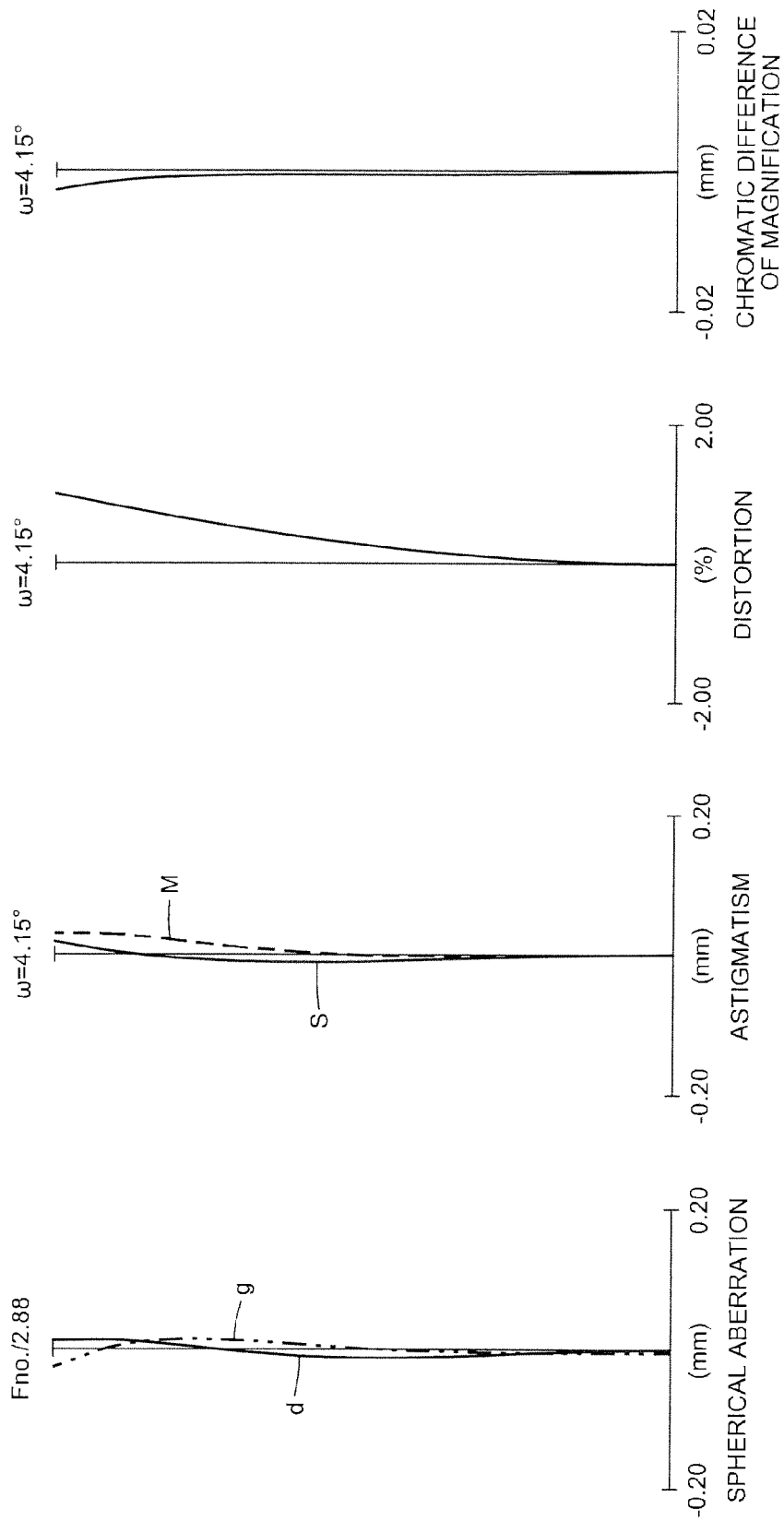
FIG. 6 is a diagram of various types of aberration (at infinity focus) in the imaging lens according to the third embodiment.

FIG. 6 is a diagram of various types of aberration (at infinity focus) in the imaging lens according to the third embodiment. In the diagram, g indicates the wavelength aberration corresponding to g-line (λ=435.83 nm), d indicates the wavelength aberration corresponding to d-line (λ=587.56 nm). Furthermore, in the diagram, S and M shown with respect to astigmatism, respectively indicate aberration at the sagittal image plane and at the meridonal image plane.

As described, in the imaging lens of the third embodiment, the focusing lens group and the anti-vibration lens group are respectively configured by 1 lens, facilitating reductions in the size and weight of these movable lens groups and enabling further reduction of the size of the optical system overall. In particular, satisfaction of the conditional expressions above suppresses the distance that the focusing lens group and the anti-vibration lens group move, facilitating further reduction of the size of the optical system and enabling further improvement of the imaging performance of the optical system. Further, the imaging lens of the third embodiment uses, as necessary, lenses having an aspheric surface and cemented lenses, whereby favorable imaging performance can be maintained by fewer lenses.

Figure 7:
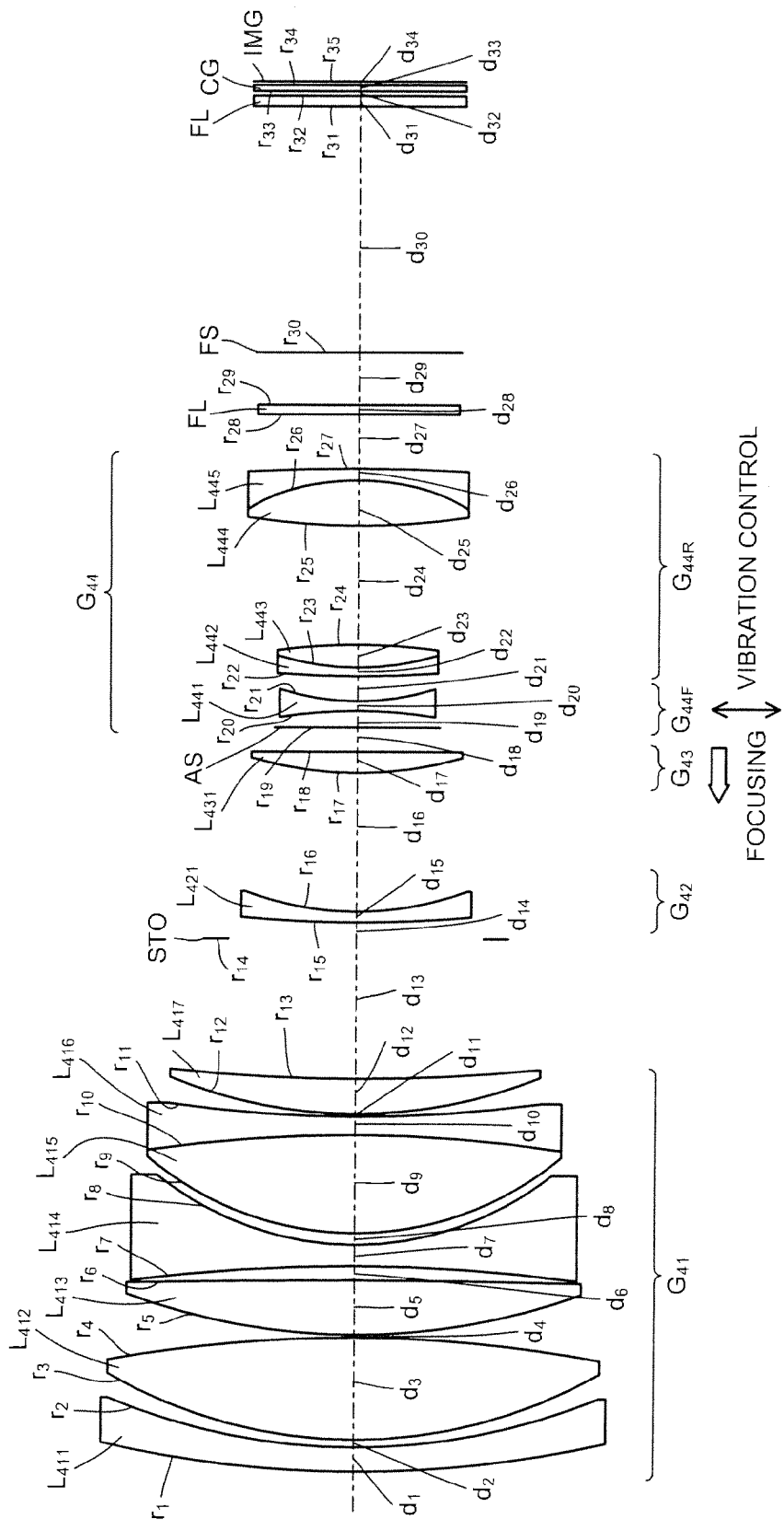
FIG. 7 is a cross sectional view (along the optical axis) of the imaging lens according to a fourth embodiment.

FIG. 7 is a cross sectional view (along the optical axis) of the imaging lens according to a fourth embodiment. The imaging lens includes sequentially from a side (object side) nearest a non-depicted object, a first lens group $G_{41}$ having a positive refractive power, a second lens group $G_{42}$ having a negative refractive power, a third lens group $G_{43}$ having a positive refractive power, and a fourth lens group $G_{44}$ having a positive refractive power. The iris diaphragm STO is disposed between the first lens group $G_{41}$ and the second lens group $G_{42}$. The iris diaphragm STO has multiple diaphragm blades and by arbitrarily changing the aperture, controls the incident optical ray bundle and adjusts the F number. The aperture stop AS is disposed between the third lens group $G_{43}$ and the fourth lens group $G_{44}$. The aperture stop AS suppresses the occurrence of aberration, which causes deterioration of the imaging performance of the optical system. Between the fourth lens group $G_{44}$ and the image plane IMG, the filter FL, the field stop FS, the filter FL, and the cover glass CG are disposed sequentially from the object side. The filters FL are disposed to block infrared light. The field stop FS is disposed to suppress optical ray bundles that are not related to the image and cause unnecessary internal reflection. The cover glass CG is disposed to protect the image plane IMG. The filters FL and the cover glass CG are disposed as needed and when not necessary, can be omitted. The optical receiving surface of the image sensor, such as a CCD, CMOS, etc. is disposed at the image plane IMG.

The first lens group $G_{41}$ includes, sequentially from the object side, a negative lens $L_{411}$, a positive lens $L_{412}$, a positive lens $L_{413}$, a negative lens $L_{414}$, a positive lens $L_{415}$, a negative lens $L_{416}$, and a positive lens $L_{417}$. The positive lens $L_{415}$ and the negative lens $L_{416}$ are cemented.

The second lens group $G_{42}$ is configured by a negative lens $L_{421}$.

The third lens group $G_{43}$ is configured by a positive lens $L_{431}$. The third lens group $G_{43}$ is moved along the optical axis, from the image plane IMG side toward the object side, whereby focusing from the state of infinity focus to the focus state for the minimum object distance is performed.

The fourth lens group $G_{44}$ includes, sequentially from the object side, a front group $G_{44F}$ having a negative refractive power and a rear group $G_{44R}$ having a positive refractive power. The front group $G_{44F}$ is configured by a negative lens $L_{441}$. Both surfaces of the negative lens $L_{441}$ are aspheric. The front group $G_{44F}$ has a function as the anti-vibration lens group. In other words, the front group $G_{44F}$ is moved in a direction that is substantially perpendicular to the optical axis (shifting of lens center), whereby blur that occurs when the optical system is subject to vibration consequent to handshake, is corrected. The rear group $G_{44R}$ includes, sequentially from the object side, a negative lens $L_{442}$, a positive lens $L_{443}$, a positive lens $L_{444}$, and a negative lens $L_{445}$. The negative lens $L_{442}$ and the positive lens $L_{443}$ are cemented. Furthermore, the positive lens $L_{444}$ and the negative lens $L_{445}$ are cemented.

Various values related to the imaging lens according to the fourth embodiment are indicated below.

(Lens data)

| | | |
|---|---|---|
| $r_1 = 231.617$ | | |
| $d_1 = 5.000$ | $nd_1 = 1.51680$ | $vd_1 = 64.2$ |
| $r_2 = 130.102$ | | |
| $d_2 = 1.260$ | | |
| $r_3 = 100.245$ | | |
| $d_3 = 21.011$ | $nd_2 = 1.49700$ | $vd_2 = 81.6$ |
| $r_4 = -301.902$ | | |
| $d_4 = 0.996$ | | |
| $r_5 = 139.863$ | | |
| $d_5 = 10.876$ | $nd_3 = 1.49700$ | $vd_3 = 81.6$ |
| $r_6 = -1782.771$ | | |
| $d_6 = 3.192$ | | |
| $r_7 = -290.488$ | | |
| $d_7 = 4.000$ | $nd_4 = 1.51680$ | $vd_4 = 64.2$ |
| $r_8 = 63.286$ | | |
| $d_8 = 2.602$ | | |
| $r_9 = 67.471$ | | |
| $d_9 = 19.975$ | $nd_5 = 1.49700$ | $vd_5 = 81.6$ |
| $r_{10} = -239.203$ | | |
| $d_{10} = 4.000$ | $nd_6 = 1.90366$ | $vd_6 = 31.3$ |
| $r_{11} = 330.756$ | | |
| $d_{11} = 0.200$ | | |
| $r_{12} = 92.906$ | | |
| $d_{12} = 7.409$ | $nd_7 = 1.84666$ | $vd_7 = 23.8$ |
| $r_{13} = 340.354$ | | |
| $d_{13} = 28.096$ | | |
| $r_{14} = \infty$ (iris diaphragm) | | |
| $d_{14} = 3.399$ | | |
| $r_{15} = 194.065$ | | |
| $d_{15} = 2.000$ | $nd_8 = 1.80518$ | $vd_8 = 25.5$ |
| $r_{16} = 53.052$ | | |
| $d_{16} = 29.037$ | | |
| $r_{17} = 83.952$ | | |
| $d_{17} = 4.000$ | $nd_9 = 1.61800$ | $vd_9 = 63.4$ |
| $r_{18} = 574.211$ | | |
| $d_{18} = 5.279$ | | |
| $r_{19} = \infty$ (aperture stop) | | |
| $d_{19} = 3.336$ | | |
| $r_{20} = -93.669$ (aspheric surface) | | |
| $d_{20} = 2.058$ | $nd_{10} = 1.61881$ | $vd_{10} = 63.9$ |
| $r_{21} = 49.638$ (aspheric surface) | | |
| $d_{21} = 5.441$ | | |
| $r_{22} = 266.974$ | | |
| $d_{22} = 1.500$ | $nd_{11} = 1.84666$ | $vd_{11} = 23.8$ |
| $r_{23} = 54.721$ | | |
| $d_{23} = 4.783$ | $nd_{12} = 1.62299$ | $vd_{12} = 58.1$ |
| $r_{24} = -121.377$ | | |
| $d_{24} = 24.477$ | | |
| $r_{25} = 125.164$ | | |
| $d_{25} = 9.417$ | $nd_{13} = 1.69895$ | $vd_{13} = 30.1$ |
| $r_{26} = -48.649$ | | |
| $d_{26} = 2.500$ | $nd_{14} = 1.60562$ | $vd_{14} = 43.7$ |
| $r_{27} = -341.764$ | | |
| $d_{27} = 10.912$ | | |
| $r_{28} = \infty$ | | |
| $d_{28} = 2.000$ | $nd_{15} = 1.51680$ | $vd_{15} = 64.2$ |
| $r_{29} = \infty$ | | |
| $d_{29} = 10.912$ | | |
| $r_{30} = \infty$ (field stop) | | |
| $d_{30} = 50.131$ | | |
| $r_{31} = \infty$ | | |
| $d_{31} = 2.200$ | $nd_{16} = 1.51680$ | $vd_{16} = 64.2$ |
| $r_{32} = \infty$ | | |
| $d_{32} = 1.000$ | | |
| $r_{33} = \infty$ | | |
| $d_{33} = 1.000$ | $nd_{17} = 1.51680$ | $vd_{17} = 64.2$ |
| $r_{34} = \infty$ | | |
| $d_{34} = 1.000$ | | |
| $r_{35} = \infty$ (image plane) | | |

(Constants of the cone (k) and aspheric coefficients ($A_4$, $A_6$))

(Twentieth plane)

k = −3.74645,
$A_4 = 0$, $A_6 = 0$
(Twenty-first plane)

k = −1.65975,
$A_4 = 0$, $A_6 = 0$ f (focal length of entire optical system) = 294.00
F no. = 2.88
2ω (angle of view) = 8.3
(Values related to conditional expression (1))
$f_1/f = 0.429$
(Values related to conditional expression (2))
$|f_2|/f = 0.308$
(Values related to conditional expression (3))
$f_3/f = 0.537$
(Values related to conditional expression (4))
$|f_4|/f = 15.090$
(Values related to conditional expression (5))
$\beta_4^2 - (\beta_3 \times \beta_4)^2 = 1.639$
(Values related to conditional expression (6))
$f_{1\text{-}2}/f = 1.137$
(Values related to conditional expression (7))
$v_{dA}$ (Abbe number for d-line of negative lens $L_{411}$, negative lens $L_{414}$) = 64.2
(Values related to conditional expression (8))
$v_{dB}$ (Abbe number for d-line of positive lens $L_{417}$) = 23.8
(Values related to conditional expression (10))
$f_{REAR}/f = 0.275$
(Values related to conditional expression (12))
$|f_{ASF}|/f = 0.177$
(Values related to conditional expression (13))
$\beta_{REAR} - (\beta_{ASF} \times \beta_{REAR}) = -1.681$ Among the values for each of the embodiments, $r_1$, $r_2$, ... indicate radii of curvature for each lens, diaphragm surface, etc.; $d_1$, $d_2$, ... indicate the thickness of the lenses, diaphragm, etc. or the distance between surfaces thereof; $nd_1$, $nd_2$, ... indicate the refraction index of each lens with respect to the d-line (λ=587.56 nm); and $vd_1$, $vd_2$, ... indicate the Abbe number with respect to the d-line (λ=587.56 nm) of each lens. Lengths are indicated in units of [mm] and angles are indicated in [degrees].

Each aspheric surface shape above is expressed by equation [1], where Z is the distance from the vertex of the lens surface to the optical axis; c(=1/r, where, r=radius of curvature) is paraxial radius of curvature at the vertex of the lens surface; h is the height from the optical axis; K is the constant of the cone; $A_4$ and $A_6$ are the fourth and sixth aspheric coefficients, respectively; and the travel direction of light is positive.

FIG. 8 is a diagram of various types of aberration (at infinity focus) in the imaging lens according to the fourth embodiment. In the diagram, g indicates the wavelength aberration corresponding to g-line (λ=435.83 nm), d indicates the wavelength aberration corresponding to d-line (λ=587.56 nm). Furthermore, in the diagram, S and M shown with respect to astigmatism, respectively indicate aberration at the sagittal image plane and at the meridonal image plane.

As described in the imaging lens of the fourth embodiment, the focusing lens group and the anti-vibration lens group are respectively configured by 1 lens, facilitating reductions in the size and weight of these movable lens groups and enabling further reduction of the size of the optical system overall. In particular, satisfaction of the conditional expressions above suppresses the distance that the focusing lens group and the anti-vibration lens group move, facilitating further reduction of the size of the optical system and enabling further improvement of the imaging performance of the optical system. In particular, in the imaging lens of the fourth embodiment, the fourth lens group, which includes the anti-vibration lens group, is configured by 2 lens groups, further simplifying the configuration of the optical system overall. The imaging lens of the fourth embodiment uses, as necessary, lenses having an aspheric surface and cemented lenses, whereby favorable imaging performance can be maintained by fewer lenses.

Furthermore, according to the present invention, configuration of the front group by a single lens element enables effective suppression of aberration at risk of occurring.

As described, the imaging lens according to the present invention is useful for digital cameras, video cameras, etc. and in particular, is suitable for imaging apparatuses equipped with a contrast detection autofocus mechanism.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2011-110768 and 2011-110769 filed in Japan on May 17, 2011.

What is claimed is:

1. An imaging lens comprising, sequentially from an object side:
   a first lens group having a positive refractive power;
   a second lens group having a negative refractive power;
   a third lens group having a positive refractive power; and
   a fourth lens group having a negative refractive power,
   wherein the third lens group is configured by a single lens element, and the third lens group is moved along an optical axis, whereby focusing is performed,
   wherein the following conditional expressions are satisfied:

$$0.4 < f_1/f < 0.5, \quad (1)$$

$$0.2 < |f_2|/f < 0.4, \quad (2)$$

$$0.4 < f_3/f < 0.6, \text{ and} \quad (3)$$

$$2.0 < |f_4|/f < 16.0, \quad (4)$$

wherein f is the focal length of the entire optical system, $f_1$ is the focal length of the first lens group, $f_2$ is the focal length of the second lens group, $f_3$ is the focal length of the third lens group, and $f_4$ is the focal length of the fourth lens group.

2. The imaging lens according to claim 1,
   wherein a conditional expression (5) $1.5 < \beta_4^2 - (\beta_3 \times \beta_4)^2 < 2.5$ is satisfied;
   wherein $\beta_3$ is lateral magnification of the third lens group and $\beta_4$ is lateral magnification of the fourth lens group.

3. The imaging lens according to claim 1,
   wherein a conditional expression (6) $1.0 < f_{1-2}/f < 2.0$ is satisfied;
   wherein $f_{1-2}$ is the combined focal length of the first lens group and the second lens group and f is the focal length of the entire optical system.

4. The imaging lens according to claim 1,
   wherein the first lens group includes at least one negative lens that satisfies a conditional expression (7) $\upsilon_{dA} > 60$;
   wherein $\upsilon_{dA}$ is the Abbe number for the d-line of at least one negative lens.

5. The imaging lens according to claim 1, further comprising a positive lens that is among the first lens group and is disposed closest to the image and satisfies a conditional expression (8) $\upsilon_{dB} < 35$;
   wherein $\upsilon_{dB}$ is the Abbe number for the d-line of the positive lens.

6. The imaging lens according to claim 1, wherein
   the fourth lens group includes, sequentially from the object side:
   a front group having a negative refractive power,
   an intermediate group having a negative refractive power, and
   a rear group having a positive refractive power,
   the intermediate group is configured by a single lens element, and
   the intermediate group is configured to move in a direction substantially perpendicular to the optical axis so as to correct blur that occurs when the optical system is subject to vibration.

7. The imaging lens according to claim 6,
   wherein the following conditional expressions are satisfied:

$$0.1 < |f_{ASM}|/f < 0.2 \text{ and} \quad (9)$$

$$0.2 < f_{REAR}/f < 0.3; \quad (10)$$

wherein $f_{ASM}$ is the focal length of the intermediate group, $f_{REAR}$ is the focal length of the rear group, and f is the focal length of the entire optical system.

8. The imaging lens according to claim 6,
   wherein a conditional expression (11) $-2.0 < \beta_{REAR} - (\beta_{ASM} \times \beta_{REAR}) < -1.6$ is satisfied;
   wherein $\beta_{REAR}$ is lateral magnification of the rear group and $\beta_{ASM}$ is lateral magnification of the intermediate group.

9. The imaging lens according to claim 1, wherein
   the fourth lens group includes, sequentially from the object side:
   a front group having a negative refractive power and
   a rear group having a positive refractive power,
   the front group is configured by a single lens element, and
   the front group is configured to move in a direction substantially perpendicular to the optical axis so as to correct blur that occurs when the optical system is subject to vibration.

10. The imaging lens according to claim 9,
    wherein the following conditional expressions are satisfied:

$$0.1 < |f_{ASF}|/f < 0.2, \text{ and} \quad (12)$$

$$0.2 < f_{REAR}/f < 0.3; \quad (10)$$

wherein $f_{ASF}$ is the focal length of the front group, $f_{REAR}$ is the focal length of the rear group, and f is the focal length of the entire optical system.

11. The imaging lens according to claim 9,
    wherein a conditional expression (13) $-2.0 < \beta_{REAR} - (\beta_{ASF} \times \beta_{REAR}) < -1.6$ is satisfied;
    wherein $\beta_{REAR}$ is lateral magnification of the rear group and $\beta_{ASF}$ is lateral magnification of the front group.

12. An imaging lens comprising, sequentially from an object side:
    a first lens group having a positive refractive power;
    a second lens group having a negative refractive power;
    a third lens group having a positive refractive power; and a fourth lens group having a negative refractive power, wherein the fourth lens group includes, sequentially from the object side:
- a front group having a negative refractive power,
- an intermediate group having a negative refractive power, and
- a rear group having a positive refractive power, the intermediate group is configured by a single lens element, and the intermediate group is configured to move in a direction substantially perpendicular to the optical axis so as to correct blur that occurs when the optical system is subject to vibration.

13. The imaging lens according to claim 12, wherein the following conditional expressions are satisfied:

$$0.1 < |f_{ASM}|/f < 0.2, \text{ and} \tag{9}$$

$$0.2 < f_{REAR}/f < 0.3; \tag{10}$$

wherein $f_{ASM}$ is the focal length of the intermediate group, $f_{REAR}$ is the focal length of the rear group, and f is the focal length of the entire optical system.

14. The imaging lens according to claim 12, wherein a conditional expression (11) $-2.0 < \beta_{REAR} - (\beta_{ASM} \times \beta_{REAR}) < -1.6$ is satisfied; wherein $\beta_{REAR}$ is lateral magnification of the rear group and $\beta_{ASM}$ is lateral magnification of the intermediate group.

15. The imaging lens according to claim 12, wherein the intermediate group has at least one aspheric surface.

16. An imaging lens comprising, sequentially from an object side:
- a first lens group having a positive refractive power;
- a second lens group having a negative refractive power;
- a third lens group having a positive refractive power; and
- a fourth lens group having a negative refractive power, wherein the fourth lens group includes, sequentially from the object side:
- a front group having a negative refractive power and
- a rear group having a positive refractive power, the front group is configured by a single lens element, and the front group is configured to move in a direction substantially perpendicular to the optical axis so as to correct blur that occurs when the optical system is subject to vibration.

17. The imaging lens according to claim 16, wherein the following conditional expressions are satisfied:

$$0.1 < |f_{ASF}|/f < 0.2 \text{ and} \tag{12}$$

$$0.2 < f_{REAR}/f < 0.3; \tag{10}$$

wherein $f_{ASF}$ is the focal length of the front group, $f_{REAR}$ is the focal length of the rear group, and f is the focal length of the entire optical system.

18. The imaging lens according to claim 16, wherein a conditional expression (13) $-2.0 < \beta_{REAR} - (\beta_{ASF} \times \beta_{REAR}) < -1.6$ is satisfied; wherein $\beta_{REAR}$ is lateral magnification of the rear group and $\beta_{ASF}$ is lateral magnification of the front group.

19. The imaging lens according to claim 16, wherein the front group has at least one aspheric surface.

* * * * *